Patented Jan. 6, 1942

2,268,642

UNITED STATES PATENT OFFICE 2,268,642

COMPOSITION IN CREAM FORM ADAPTED TO REMOVE HARDENED LIQUID NAIL POLISH AND METHOD OF MAKING SAME

Horace M. Carter, New York, N. Y.

No Drawing. Application August 19, 1937
Serial No. 159,915

11 Claims. (Cl. 252—122)

This invention relates to a cream base material adapted to remove liquid nail polish after it has been applied and has become hardened.

The basic ingredients necessary to formulate a foundation or vanishing cream are a higher fatty acid such as stearic acid, an alkali and water. The amount of soap that is formed by reaction between the alkali and fatty acid is proportionate to the amount of alkali used which in turn determines the amount of unsaponified fatty acid that occurs in the cream. Vanishing cream as a rule contains a high percentage of water such as from 70% to 80%. It is this high water content which allows the cream to "vanish" when applied to the skin. If the water content is much lower than the usual percentage the cream rolls badly when rubbed onto the skin.

I have found that the water component of a foundation or vanishing cream may be replaced in part by liquids which have the property of dissolving material such as nitrocellulose, which is used as the base for liquid nail polish, while retaining the characteristics of a true foundation or vanishing cream. I have also found that the new cream thus formulated has the power of removing liquid nail polish, which has been applied and which has become hardened, with substantially the same rapidity and effectiveness as straight solvents for the base of the liquid nail polish. The nail polish remover in cream form which I have produced is a wholly satisfactory cosmetic preparation with respect to color, odor, ease of application, stability and harmlessness. Moreover, the cream not only removes liquid nail polish but also has emollient properties for the nail and cuticle.

Liquid nail polish usually contains nitrocellulose or other cellulose ester or ether such as cellulose acetate dissolved in a suitable solvent. Some nail polishes also contain a gum, resin, wax or the like. A plasticizer is frequently used in liquid nail polish when desired, together with some pigment or dye. Celluloid can be used as the base of liquid nail polish. In formulating the liquid nail polish, well known solvents are used such as acetone or the like. When the liquid nail polish is applied to the finger nails the solvent evaporates leaving the hardened non-volatile glossy base. The base material of the liquid nail polish after it has been applied, may of course be removed by applying solvents such as the solvents used in originally making up the nail polish. Such solvents or solvent mixtures have been sold for use in removing hardened liquid nail polish. The use of such solvents to remove hardened liquid nail polish is however objectionable because such solvents have the property of leeching certain natural oils from the finger nails causing the nails to become brittle. Moreover, the solvents, by dissolving the base for the liquid nail polish together with the pigment or dye that was used, tends to cause the pigment or dye to run under the finger nails and around the cuticle so as to permanently discolor the ends of the nails and surrounding parts. The use of the cream base material formulated according to this invention and adapted to remove hardened liquid nail polish is not attended with any of the difficulties above mentioned which have been incident to the use of ordinary solvents or solvent mixtures heretofore used for removing hardened liquid nail polish.

In formulating a cream base material adapted to remove hardened liquid nail polish a certain amount of water is essential in order to produce, together with the saponified higher fatty acid, a cream base with which the solvent for a base of a liquid nail polish may be mixed. With regard to the solvent it is apparent that there are many which may be used. The nature of the solvent depends in part upon the base of the liquid nail polish which is to be removed. Since nitrocellulose is the most common base for liquid nail polish the solvent selected should preferably be one which is a solvent for nitrocellulose. For removing other base materials such as cellulose ethers and other cellulose esters, solvent material appropriate to dissolve such materials should be used. Moreover, it is preferable to use a solvent (which term includes solvent mixtures), which is adapted to dissolve not only nitrocellulose or other cellulose esters or ethers but also other base materials included in liquid nail polish such as resins, gums, waxes and the like.

The following is illustrative of a nail polish remover formulated in cream form.

| | |
|---|---|
| Stearic acid | 20 gm. |
| Potassium hydroxide (85%) | 1.3 gm. |
| Cetyl alcohol | 2.0 gm. |
| Butyl acetate-alcohol mixture | 8.0 cc. |
| ⅔ butyl acetate | |
| ⅓ butyl alcohol | |
| Acetone | 30.0 cc. |
| Carbitol | 8.0 cc. |
| Water | 31.0 cc. |
| Sodium hydroxide (10% water solution) | 5.0 cc. |
| Perfume | As desired. |
| Vitamin F | Sufficient to give 120 units per gram of cream. |

The method of preparing the above mentioned material is as follows:

The stearic acid and cetyl alcohol are heated together to a temperature of about 75° C. The potassium hydroxide is added to the water and heated to 75° C. and the resulting potassium hydroxide solution is added slowly and with constant stirring to the melted stearic acid-cetyl alcohol mixture. The stirring is continued until the saponification and emulsification is complete and the resulting product becomes quite firm in consistency. The Carbitol in which any perfume that is used is dissolved, is then added to the mixture and the mixture is stirred until it is uniform. At this stage the product assumes a semi-solid consistency. Thereafter the vitamin F is added and this is followed by the addition of the butyl acetate, butyl alcohol and acetone. The stirring apparatus should now be closed to prevent loss of the volatile solvents. Upon mixing the solvents with the other ingredients the product assumes a liquid form. After the solvents have been thoroughly incorporated the 10% solution of sodium hydroxide is added and the mixture is again agitated. The product rapidly assumes the consistency of a cream which may be transferred to tubes or other suitable containers. The product is substantially pure white and is stable under extremes of ordinary atmospheric temperature. Moreover, the product, when tested by storage for several months, showed no separation. While the product has all the appearance and properties of a foundation or vanishing cream it has the property of immediately removing the standard brands of liquid nail polish which are sold on the market at the present time.

I have found that an alkali such as potassium hydroxide should be used in combination with sodium hydroxide. The soap produced by the reaction of the potassium hydroxide with stearic acid appears to have the property of retaining or carrying in intimate admixture a relatively large amount of solvents without separation from the soap base. The sodium soap, on the other hand, has the property of stiffening the mass so that it remains in cream form notwithstanding the presence of a relatively large amount of liquids. In addition to potassium hydroxide I may also use other alkalis as saponifying agents, namely, ammonium hydroxide, triethanolamine, a mixture of triethanolamine and borax, potassium carbonate and the like. In all cases, however, the use of such alkalis is followed by the use of sodium hydroxide in sufficient quantity to produce a stable product of cream consistency. The sequence of addition of the alkalis is also important, namely, the fatty acid material should first be saponified or partially saponified with the potassium hydroxide or its equivalent, and the solvents should be incorporated before the sodium hydroxide is added to finally stiffen the mass. In this manner I have found that a cream containing a large quantity of liquids, including solvents, can be produced which does not separate upon standing or upon subjection to extreme conditions of atmospheric heat and cold.

In the example above given cetyl alcohol was used in addition to stearic acid. The cetyl alcohol is a non-saponifiable body which is insoluble in water and which remains in the stearic acid base. The cetyl alcohol is an emollient for the finger nails and since it is non-saponifiable it remains as such in the finished cream. In preferred practice I desire to include in the cream a non-saponifiable emollient such as cetyl alcohol. Other non-saponifiable emollients which may be used are butyl stearate, liquid petrolatum, cholesterin, cocoa butter, lecithin, spermaceti, wool fat and the like. In certain cases an emollient can also be supplied in the finished cream by using oils such as the fixed oils, almond oil, olive oil or the like which are emollients for the finger nails. However, when such oils are used they should be added after saponification of the stearic acid has taken place so as to avoid converting such oils into soaps. Of course, during the saponification of the stearic acid an excess alkali should not be used which would react with the subsequently added saponifiable oils which it is desired to have present in a non-saponified condition. Usually the fatty acid material such as stearic acid is used in excess of that which is saponified by the alkali and in such case the free fatty acid in the cream composition also acts as an emollient. The free fatty acid or other emollient also tends to give body to the cream.

The vitamin F is a non-saponifiable body which has a specific effect in stimulating the nails and preventing them from becoming brittle.

Carbitol (di-ethylene glycol mono-ethyl ether) I regard as a desirable ingredient of the cream as this substance has a high boiling point and retards the drying of the cream and the excessive evaporation of the solvents. Moreover, the material is slightly hygroscopic. Carbitol also exercises a softening and soothing effect on the skin without causing stickiness and is an excellent solvent for perfume. While Carbitol is preferred, glycerin may be used to replace the Carbitol in whole or in part.

Of the higher fatty acids, the one which is most generally used and which I prefer to use in formulating my cream is stearic acid. As above described the stearic acid is initially introduced in unsaponified condition and is partly saponified by reaction with alkali. It is, of course, not essential that the stearic acid be incorporated in an unsaponified condition. In other words, the fatty acid material may be introduced in already saponified condition. For example, the stearic acid or part thereof may have been previously reacted with any of the alkalis above mentioned. In addition, other products such as glycol stearate, glyceryl monostearate and the like may be used. Moreover, other soaps may be used, e. g., triethanolamine soap, curd soap, lard soap, or the like.

In formulating the cream it is desirable to have a higher fatty acid material present. The fatty acid material is preferably only partially saponified so that part of the fatty acid material occurs as a water-soluble soap of the fatty acid and part of the fatty acid material occurs as a free fatty acid which is insoluble in water. The soap component tends to hold the liquid including water and solvent in the cream base without separation. While the soap component gives body to the cream, the unsaponified fatty acid material is even more instrumental in imparting creamy characteristics to the composition and also, as aforesaid, acts as an emollient. The water-soluble soaps of higher fatty acids such as stearic acid are to be regarded as including not only fatty acid salts of alkali metals but also esters of fatty acids such as glycol stearate, glyceryl mono-stearate, triethanolamine stearate and the like. Preferably the fatty acid material constitutes about 15% to 35% of the cream composition, and as aforesaid, part of this material may occur as a water-soluble soap and part in an unsaponified condition. Preferably about 10% to 35% of the fatty acid material is in the form of a water-soluble soap such as a stearic acid soap. It is also preferable that at least about 10% of water be contained in the cream composition in combination with the soap. While it is preferable to have some unsaponified higher fatty acid in the cream composition, the unsaponified fatty acid may be replaced in whole or in part by other materials such as emollients, waxes, prepared soaps, sulfonated castor oil, olive oil, peanut oil, sesame oil, hydrogenated oil, quince seed, tragacanth, or the like.

The solvent for the base of the liquid nail polish may include a single substance such as acetone but preferably includes a solvent mixture. Preferably the solvent in the amount used is adapted to be mutually miscible with the water that is used so as to form a homogeneous mixture. For example, I have found that 10 volumes of acetone, 5 volumes of butyl acetate and 2½ volumes of butyl alcohol form a homogeneous mixture with 5 volumes of water. In this example the acetone and butyl acetate are specific solvents for nitrocellulose, while butyl alcohol and water are non-solvents for nitrocellulose. Acetone is miscible with water in all proportions, while butyl acetate is normally substantially immiscible with water. In this mixture the acetone acts as a common solvent or coupling agent which enables the butyl acetate and water to go into mutual solution. The butyl alcohol also contributes to this effect. The butyl alcohol, although non-solvent for nitrocellulose, acquires solvent properties for nitrocellulose when mixed with butyl acetate and the mixture has greater solvent power for substances other than nitrocellulose than does butyl acetate alone. The butyl acetate contributes to the solvent power of the mixture in the presence of water inasmuch as the butyl acetate does not lose its solvent power for nitrocellulose as rapidly as acetone upon being diluted with water. Moreover, the presence of the butyl acetate enables the solvent component of the composition to dissolve a greater number of substances. Acetone per se evaporates relatively rapidly. The butyl acetate and butyl alcohol evaporate much less rapidly thus tending to prevent evaporation of the solvent from the cream product and preventing too rapid evaporation of the solvent when the cream is used in removing hardened liquid nail polish. Of course the fact that my composition has a cream base also tends to prevent evaporation of all of the volatile solvents contained therein. The combination of acetone, butyl acetate, water and butyl alcohol has been found by me to be an especially suitable one as the liquid component of a cream adapted to remove hardened liquid nail polish. The cream composition appears to have substantially as much solvent power for nitrocellulose, for example, as straight solvents for nitrocellulose. Of course the different individual solvents in the solvent component of the composition may be used in different proportions from that above illustrated. Moreover, the butyl alcohol may be omitted but not without sacrificing the advantages which result from its presence. As above stated it is preferable that the solvent component form a homogeneous solution with water inasmuch as superior solvent action is obtained. In the specific formulae herein given illustrating this invention, the solvents and water are adapted to form a homogeneous mixture. However, it is not essential in the practice of this invention that the liquid components (water plus solvent component) of the cream form a homogeneous mutual solution with each other inasmuch as a cream composition can be made according to this invention which is adapted to dissolve nitrocellulose with considerable rapidity notwithstanding that the water and solvent components are not in mutual solution.

While certain specific solvents have been mentioned above, other solvents may be selected as desired such as ethyl acetate, di-acetone, ethyl lactate, methyl lactate, Carbitol acetate, and the like. In preparing the cream solvents are used which contain a group selected from the carbonyl, ester, and hydroxyl groups.

The amount of solvent that is used in the cream composition depends to some extent upon the nature of the solvent that is used and upon the character of the non-solvents such as water or other non-solvent diluents with which it is mixed. Generally at least 10% of a solvent is used and preferably at least 30% of solvent is used in the cream composition. In any case an amount of solvent should be used which renders the finished cream composition capable of dissolving the hardened base of liquid nail polish, e. g., nitrocellulose. When reference is made herein and in the appended claims to solvent or solvent component it is to be understood that reference is made not only to a single solvent substance but also a combination of solvent substances. For example the "solvent" in the example hereinabove given consists of acetone and butyl acetate.

Another formula of a cream embodying this invention which illustrates the use of pigments is as follows:

| | |
|---|---|
| Stearic acid | 20 gm. |
| Potassium hydroxide 85% | .5 gm. |
| Butyl acetate-alcohol mixture | 16.0 cc. |
| 66% butyl acetate | |
| 34% butyl alcohol | |
| Acetone | 36.0 cc. |
| Titanium oxide | .25 gm. |
| Tin oxide | .25 gm. |
| Cetyl alcohol | 1.0 gm. |
| Carbitol | 2.5 cc. |
| Water | 25.0 cc. |
| Sodium hydroxide (10% water solution) | 10.0 cc. |
| Perfume | As desired |

The method of preparing the composition is the same as the method hereinabove described. However, when the titanium oxide, tin oxide, or other powdered material is incorporated with the cream, it is necessary to levigate the powder with the Carbitol (or some other liquid such as glycerin or water) and add the mixture to the soap before the addition of the other ingredients. I have found it is unsatisfactory to attempt to incorporate a powder in a dry state after the cream has been made up for in such case the added powder tends to produce grittiness in the mixture and tends to cause the emulsified liquid material to break and separate out. The pigment in the cream acts as a whitening agent for the tip of the nail and also supplies covering power for the cream. In certain cases talcum may be added to the cream which has the property of supplying "slip" to the finished product.

The method by which a cream embodying this invention may be produced requires only the usual apparatus which is used in the manufacture of cosmetic creams. It is also an advantage that the method can be carried out without any interruptions or delays in the preparation of the cream.

The cream product may be sold for use in the home or in the beauty shop. Moreover, it can be conveniently packed in tubes or other containers which can be carried without fear of spilling and without loss due to evaporation. It is a disadvantage of liquid nail polish removers in the form of straight solvents, that they are subject to considerable waste due to evaporation. The cream can be applied efficiently, in fact, a lesser amount of the cream is required to remove the hardened liquid nail polish than is necessary when a straight solvent is used. After the cream has been applied the non-saponifiable emollient and/or unsaponified fatty acid or oily material remains as an emollient for the finger nails and surrounding skin. Moreover, the solvent mixture contained in the cream as preferably made up evaporates so as to leave no odor or suggestion of "banana oil" which is usually incident to liquid nail polishes and materials used in removing them. When perfume is used all that remains is the odor afforded by the perfume.

I claim:

1. A composition in cream form adapted to dissolve hardened liquid nail polish which comprises in intimate admixture water, a water-soluble soap and free stearic acid in greater proportion than said soap, said free stearic acid and soap constituting at least about 15% of the cream, and a solvent for nitrocellulose, said solvent being present in sufficient amount to render said cream composition capable of dissolving nitrocellulose.

2. A composition in cream form adapted to dissolve hardened liquid nail polish and containing no free alkali which cream comprises an intimate admixture of a water-soluble soap of a higher fatty acid, an unsaponified emollient in greater proportion than said soap, at least 10% of water, and a solvent for cellulose nitrate, said fatty acid soap and emollient being present in sufficient amount to impart cream characteristics to said admixture and said solvent being present in sufficient amount to render said composition capable of dissolving cellulose nitrate, the combined water and solvent in the cream being present in substantially greater proportion than the combined soap and unsaponified emollient in said cream.

3. A composition in cream form adapted to dissolve hardened liquid nail polish which comprises in intimate admixture, a sodium soap of stearic acid, a stearic acid soap of an alkali other than sodium, unsaponified stearic acid, at least 10% of water, and a solvent for a substance selected from the substances cellulose esters and cellulose ethers, said soaps of stearic acid and said unsaponified stearic acid being present in sufficient amount to impart cream characteristics to said admixture and said solvent being present in sufficient amount to render said composition capable of dissolving said substance.

4. A composition in cream form adapted to dissolve hardened liquid nail polish which comprises in intimate admixture water, a water-soluble soap of a higher fatty acid, an emollient including unsaponized higher fatty acid, said water-soluble soap of a higher fatty acid and said emollient being present in sufficient amount to impart cream characteristics to said admixture, and a solvent for cellulose nitrate, said solvent and said water in the amounts said substances are used being in mutual solution, and said solvent being present in said cream in sufficient amount to render said composition capable of dissolving nitrocellulose.

5. A composition in cream form adapted to dissolve hardened liquid nail polish which comprises a water-soluble soap of stearic acid, an emollient including an unsaponified higher fatty acid, water, acetone and butyl acetate.

6. A composition in cream form adapted to dissolve hardened liquid nail polish which comprises a water-soluble soap of stearic acid, an emollient including unsaponified stearic acid, said emollient and said water-soluble soap of stearic acid being present in sufficient amount to impart cream characteristics to the composition, at least 10% of water, acetone, butyl acetate and butyl alcohol, said water, acetone, butyl acetate and butyl alcohol being employed in relative amounts adapted to afford a homogeneous solution having solvent property for cellulose nitrate.

7. A composition in cream form adapted to dissolve hardened liquid nail polish which comprises about 15% to 35% of higher fatty acid at least about 10% of which is saponified to form a water-soluble soap, at least 10% of water, an unsaponified emollient which, including any unsaponified fatty acid material, is present in an amount substantially greater than the amount of said saponified fatty acid material and a solvent for a substance selected from the group consisting of cellulose esters and cellulose ethers, said solvent being present in sufficient amount to render said cream capable of dissolving said substance, the combined water and solvent in the cream being present in greater proportion than the combined saponified fatty acid and emollient.

8. A composition in cream form adapted to dissolve hardened liquid nail polish which comprises about 15% to about 35% of stearic acid about 10% to about 35% of which is saponified to form a water-soluble soap and the remainder of which is unsaponified, at least 10% of water, and a solvent for cellulose nitrate that is present in sufficient amount, at least approximately 30%, to render said composition capable of dissolving cellulose nitrate, the combined water and solvent in the cream being present in greater proportion than the combined unsaponified stearic acid and water-soluble saponified stearic acid.

9. In the manufacture of a composition in cream form adapted to remove hardened liquid nail polish, the steps comprising preparing a mixture of water, a water-soluble soap of a higher fatty acid and unsaponified higher fatty acid, then dispersing a solvent for a substance selected from the group consisting of cellulose esters and ethers to the mixture, the mixture being agitated to cause the unsaponized fatty acid to be emulsified with the solvent and water, and subsequently adding sodium hydroxide to the mass, unsaponified fatty acid being thereafter saponified by said sodium hydroxide to stiffen the mass to a cream form.

10. In the manufacture of a composition in cream form adapted to remove hardened liquid nail polish, the steps comprising partly saponifying stearic acid with potassium hydroxide in the presence of water to form a mixture containing water, a potassium soap of stearic acid and free stearic acid, then dispersing a solvent for nitrocellulose in the mixture thereby reducing the mixture to a liquefied state wherein the saponified stearic acid is emulsified with water and solvent, and subsequently adding sodium hydroxide to the mixture, unsaponified stearic acid being thereafter saponified by said sodium hydroxide to stiffen the mass to cream form.

11. In the manufacture of a composition in cream form to remove applied liquid nail polish, the steps comprising levigating a powder material selected from the group of materials consisting of tetanium oxide and tin oxide with a liquid which is non-reactive with said powder material, adding the levigated powder to a water-soluble soap of a fatty acid to form an intimate admixture of these materials, and thereafter dispersing a solvent for a substance selected from the group of substances consisting of cellulose esters and cellulose ethers in the resulting mixture.

HORACE M. CARTER.

CERTIFICATE OF CORRECTION.

Patent No. 2,268,642.  January 6, 1942.

HORACE M. CARTER.

It is hereby certified that error appears in the printed specification of the above numbered patent requiring correction as follows: Page 4, first column, line 49, claim 3, strike out the comma after "admixture"; and second column, line 55, claim 9, for "unsaponized" read --unsaponified--; line 69-70, claim 10, for "saponified" read --unsaponified--; and that the said Letters Patent should be read with this correction therein that the same may conform to the record of the case in the Patent Office.

Signed and sealed this 17th day of February, A. D. 1942.

(Seal)

Henry Van Arsdale,
Acting Commissioner of Patents.